US010260963B2

(12) United States Patent
Savaria et al.

(10) Patent No.: US 10,260,963 B2
(45) Date of Patent: Apr. 16, 2019

(54) LAUNDRY PROCESS TEMPERATURE INDICATORS / MARKERS AND FABRICS INCORPORATING SAME

(71) Applicant: WESTPOINT HOME LLC, New York, NY (US)

(72) Inventors: Norm Savaria, New York, NY (US); Billy Harris, Anderson, SC (US); Judson Lusk, Clemson, SC (US)

(73) Assignee: WESTPOINT HOME LLC, New York, NY (US)

( * ) Notice: Subject to any disclaimer, the term of this patent is extended or adjusted under 35 U.S.C. 154(b) by 337 days.

(21) Appl. No.: 14/910,335

(22) PCT Filed: Aug. 11, 2014

(86) PCT No.: PCT/US2014/050530
§ 371 (c)(1),
(2) Date: Feb. 5, 2016

(87) PCT Pub. No.: WO2015/021464
PCT Pub. Date: Feb. 12, 2015

(65) Prior Publication Data
US 2016/0178454 A1     Jun. 23, 2016

Related U.S. Application Data

(60) Provisional application No. 61/864,399, filed on Aug. 9, 2013, provisional application No. 61/864,395, filed on Aug. 9, 2013.

(51) Int. Cl.
*G01K 11/00* (2006.01)
*G01K 1/00* (2006.01)
*G01K 11/16* (2006.01)

(52) U.S. Cl.
CPC .................................. *G01K 11/16* (2013.01)

(58) Field of Classification Search
USPC ................................................ 374/162, 141
See application file for complete search history.

(56) References Cited

U.S. PATENT DOCUMENTS

| 4,681,791 A * | 7/1987 | Shibahashi ............ B41M 5/287 428/96 |
| 4,717,710 A | 1/1988 | Shimizu |
| 5,911,930 A * | 6/1999 | Kinlen ...................... D01F 6/46 264/104 |
| 7,674,747 B1 * | 3/2010 | Long ....................... D06P 1/004 503/201 |
| 2002/0090510 A1 * | 7/2002 | Ono ......................... D01F 1/04 428/375 |
| 2005/0274274 A1 * | 12/2005 | Gore ................... C09B 67/0077 101/491 |
| 2008/0233379 A1 | 9/2008 | O'Connor |
| 2008/0279253 A1 * | 11/2008 | MacDonald ......... A41D 13/002 374/162 |
| 2009/0046760 A1 * | 2/2009 | Matheson ............ A41D 13/005 374/141 |
| 2009/0278090 A1 | 11/2009 | Lucht |
| 2010/0012017 A1 | 1/2010 | Miller |
| 2012/0242009 A1 * | 9/2012 | Mullane ................ A61F 13/513 264/405 |
| 2014/0266806 A1 | 9/2014 | Gao et al. |
| 2015/0088027 A1 * | 3/2015 | Cranston ................... D01F 8/00 600/549 |

FOREIGN PATENT DOCUMENTS

WO     2015021464 A2     2/2015

OTHER PUBLICATIONS

PCT International Search Report related to Application PCT/US2014/050530 (WO 2015/021464), dated Nov. 13, 2014, (2 pages).
Written Opinion of the International Searching Authority related to Application PCT/US2014/050530 (WO 2015/021464), dated Nov. 13, 2014 (6 pages).

* cited by examiner

*Primary Examiner* — Mirellys Jagan
(74) *Attorney, Agent, or Firm* — Seyfarth Shaw LLP

(57) ABSTRACT

The invention is a fabric-based article, or linen, including a temperature-sensing indicator to report whether the article has been subjected to laundering/processing temperatures in excess of a threshold recommended temperature. The temperature-sensing indicator visually reports whether the fabric-based article has exceeded the threshold temperature by changing color upon application of heat in excess of the threshold temperature. The temperature-sensing indicator may be incorporated into the body of the linen itself as part of the fabric or may be affixed to a linen as a tag or label.

6 Claims, No Drawings

United States Patent 10,260,963 B2

LAUNDRY PROCESS TEMPERATURE INDICATORS / MARKERS AND FABRICS INCORPORATING SAME

CROSS-REFERENCE TO RELATED APPLICATIONS

This application claims the benefit under 35 U.S.C. § 119(e) of U.S. provisional patent application Ser. No. 61/864,395 entitled "Process Temperature Indicators/Marker" filed on Aug. 9, 2013 and U.S. provisional patent application Ser. No. 61/864,399 entitled "Process Temperature Indicators/Marker and Marker Composition", the entire disclosures of which are incorporated herein by reference.

TECHNICAL FIELD

This disclosure is directed to linens and fabric-based articles that include a temperature-sensing indicator to report whether the article has been subjected to laundering/processing temperatures in excess of a threshold recommended temperature.

BACKGROUND OF THE INVENTION

The laundry process is a critical function in the overall operation of a hotel or inn in regards to the daily preparation of the customer rooms. It is important to the hotel to outfit each room with a consistently clean set of bed linens and towels that show no sign of stain or discoloration. A set of bed linens and towels that are not damaged beyond use can see from 150-250 laundry cycles. The laundry process involves an agitated wash bath including water, detergent, stain removers and softeners and is completed with a drying process.

Bed linens for the hospitality market may be constructed of 100% cotton or various cotton/polyester blends. Laundry instructions are provided for these products by manufacturers, which include maximum heat processing temperatures. Cotton, polyester, and blends thereof have limitations in regards to exposure to heat. Excessive exposure to heat beyond the recommended levels can breakdown the fibers resulting in loss of strength and pliability, excessive shrinkage, scorching, and other damage to the fabrics whether visible or not.

The drying process can vary from hotel to hotel depending on whether the hotel has an "on-site" laundry which they operate, or if the laundry is outsourced to a commercial third party. On-site properties primarily employ a heated, tumble dry system of drying where the bed linens and towels are removed from the dryer with a small percentage of moisture still in the fabric to reduce the risk of overheating and also to assist in minimizing wrinkling of the fabric. A commercial laundry may also employ heated tumble dryers but may also employ an additional process of running the sheets and pillowcases through a series of heated rollers to finish the drying process along with pressed, reduced wrinkle appearance. In an attempt to improve productivity, the heated rollers may be operated at a temperature that exceeds the recommended processing temperature for the fabrics. Exposure to excessive heat damages the fabric product so that it must be taken out of service and replaced with new product.

Many hotels file claims against the product manufacturer for defective product due to the breakdown of fibers that result in loss of strength and pliability, excessive shrinkage, scorching, and other damage. While the actual defect is likely to be caused by the excessive and/or improper exposure to heat during the drying process, the product manufacturer has difficulty establishing this fact due to the absence of a verifiable heat processing history. Returns and replacement product can create significant cost for the manufacturer and results in wasted product.

The ability to determine if linens have been exposed to a temperature above the recommended level during the laundry process would give both manufacturers and hotels that purchase bed linens the opportunity to dispute false defective claims and establish proof of temperature abuse of the product. Incorporation of a temperature sensitive indicator during the manufacturing of the bed linens would create a record of any occurrence of excessive heat exposure. The key to this indicator would be that it changes color and remains in the newly changed color after cooling.

It would be advantageous to provide a fabric product having an indicator incorporated into the product that will visually report whether the product has been subjected to a temperature exceeding a maximum processing temperature. It would be advantageous to provide an indicator that changes color upon exceeding a threshold temperature, and does not further change color or revert to its original color upon falling below the threshold temperature. It would be advantageous for the indicator to be permanently incorporated into the fabric product itself or semi-permanently into the product as a tag.

SUMMARY OF THE INVENTION

The invention is a fabric-based product incorporating a temperature-sensitive indicator to visually report whether the product has been subjected to a temperature in excess of a threshold temperature. It is an object of the invention to provide a fabric-based product such as a bed sheet, pillowcases, or towel with a temperature indicator incorporated into the body of the product.

The object described above can be accomplished by incorporating a permanent or semi-permanent temperature-sensitive temperature indicator into a fabric product. Temperature-sensitive thread or yarns used in construction of the linens or strategically placed during weaving or finishing may act as a temperature indicator. A finished linen, or a portion thereof, may be dyed with a temperature-sensitive composition which would act as a temperature indicator. A finished linen may have a temperature-sensitive label affixed to the linen comprised of temperature-sensitive material or temperature-sensitive ink printed thereon.

It is an object of the invention to provide a method of making a fabric-based product that incorporates a temperature-sensitive temperature indicator. It is an object of the invention to provide a method for reporting a laundering process of a fabric-based product that exceeds a threshold temperature.

DETAILED DESCRIPTION OF THE INVENTION

Embodiments of the present invention provide an improved linen or textile incorporating a temperature-sensitive indicator. More particularly, the temperature-sensitive indicator may be thermochromic-changing color permanently upon application of heat in excess of a threshold temperature. The thermochromic indicator is designed to report whether a linen has been subjected to a temperature in excess of the manufacturer's recommended threshold temperature, such as through laundering and processing.

The fabrics of the invention may be in the form of, for example, linens, including but not limited to, bed linens, bed sheets, pillow cases, comforters, bedspreads, quilts, pillow shams, duvet and comforter covers, mattress pads, bed blankets, table linens, tablecloths, napkins, towels, bath towels, hand towels, bath sheets, wash cloths, beach towels, kitchen towels, and the like, or any other article of manufacture that may be washed and dried, which may preferably be commonly used in the hospitality and healthcare facility industries, for example.

In a preferred embodiment the linen of the invention is a bed sheet. In a preferred embodiment the linen of the invention is a towel. In a preferred embodiment the linen of the invention is a pillowcase. In a preferred embodiment the linen of the invention is a blanket.

A fabric may include, for example, cellulosic materials, synthetic materials, or cellulosic/synthetic blends. Preferably the material is a cellulosic material, such as, for example, cotton. Non-limiting examples of cellulosic materials may include cotton, hemp, jute, flax, abacá, lyocell, rayon, bamboo, ramie, blends thereof, and the like, and blends with other fibrous materials (such as, for example, synthetic fibers) in which at least about 60 percent, preferably at least about 65 percent of the fibers are cellulosic materials. Synthetic material includes, for example, polyolefins, such as elastolefin or polypropylenes, polyester, nylon, polyurethane, acetate, polytrimethyl terephthalate (PTT), silk, or wool, and the like, and may include mixtures or blends thereof.

In a preferred embodiment the linen is made of a single piece of material or fabric. Preferred examples of materials include cotton, polyester, satin, wool, brushed polyester microfiber, silk, spandex, linen, bamboo, rayon, nylon, cellulose acetate, carbon fiber, aramid, fleece, flannel, denim, velvet, hemp, plastic, acrylic, rubber or paper. In one embodiment the linen may be 100% cotton; in one embodiment the linen may be about 100% cotton; in one embodiment the linen may be 100% polyester; in one embodiment the linen may be about 100% polyester. In one embodiment the linen may be 100% silk; in one embodiment the linen may be about 100% silk.

In another embodiment the linen material may be made of blends or combinations of materials or fabrics such as those identified herein. Examples of such combinations include a cotton/polyester blend, a silk/cotton blend, and a bamboo/cotton blend. In one embodiment the material is about 60% cotton and about 40% polyester; in another embodiment the material is about 50% cotton and about 50% polyester; in another embodiment the material is about 35% cotton and about 65% polyester. The material may be formed in a variety of colors and textures as desired.

A thermochromic temperature-sensitive indicator is incorporated into the linen. In one embodiment a thermochromic indicator is incorporated into the fabric of the linen itself during manufacture, such as during weaving. In one embodiment the thermochromic indicator is incorporated into thread or yarn that makes up the fabric of the linen itself. In one embodiment, a thermochromic indicator is strategically placed into the linen itself during manufacture or during finishing. In one embodiment the thermochromic indicator is incorporated into threads or yarns that are strategically placed within the makeup of the fabric itself.

In one embodiment a thermochromic indicator is incorporated into a finished linen by dying the linen—in part or in whole—with a thermochromic material. In one embodiment the entire linen is dyed in a thermochromic indicator; in one embodiment an edge of a linen is dyed in a thermochromic indicator; in one embodiment only a corner of a linen is dyed in a thermochromic indicator.

In one embodiment a thermochromic indicator is incorporated into a temperature-sensitive label or tag affixed to the linen. The label or tag may be comprised of a temperature-sensitive thermochromic material or may have temperature-sensitive ink printed thereon. In one embodiment a label is comprised of a thermochromic material and affixed to a linen. In one embodiment a label has thermochromic ink printed on the label so that the ink is not visible below a threshold temperature but becomes visible upon exceeding a threshold temperature. The ink may be printed in a visible pattern on the label or may be used to print text indicating the linen has exceeded a threshold temperature—such as identifying the specific temperature threshold exceeded or words such as "This product has been subjected to a temperature in excess of that recommended by the manufacturer."

Thermochromic indicators for use in the present invention include fibers, yarns, threads, and inks. The thermochromic indicators used in the invention appear as a first color (or do not appear at all—that is, invisible) while below a threshold temperature and then appear as a second color (or appear visible for the first time) when subjected to a temperature in excess of the threshold temperature. The thermochromic indicators used in the invention and do not further change color (or revert to the original color or disappear) upon falling below a threshold temperature. Thermochromic indicators used in the present invention may therefore be characterized as permanent, or nonreversible indicators. Permanent, or nonreversible, thermochromic indicators are used, for example, in the field of autoclaving where special adhesive tape is used to secure instrument packages and indicates whether a specific temperature (typically about 250 degrees Fahrenheit) is achieved. Nonreversible, temperature indicating labels may be obtained from commercial providers such as McMaster-Carr and Omega.

An example of an indicator composition implementation can be found in the discussion of "Direct Thermal Printing" Section 1.4.24 in Chromic Phenomena Technological Applications of Colour Chemistry by Peter Bamfield and Michael G. Hutchings (2010—ISBN 978-1-84755-868-8), which is incorporated herein by reference. In that section, it is disclosed that simply heating a chemically pre-treated material (e.g., paper) with a thermal head causes the components to react and produce the colored image. Color formers for black images are the fluorans, although blue e.g. Pyridyl Blues and yellow shading components are available. Poor image stability to light and heat is an inherent problem with the system and to help counteract these disadvantages, hindered phenols are included as stabilizers. This demonstrates that the change in color is permanent and therefore the color on the fabric is not affected when the heat is removed.

The thermochromic indicator of the invention may be tailored to report a temperature exceeding any desired threshold temperature. A particular threshold temperature may be selected based on a variety of factors, including the type of fabric used (e.g., cotton, silk), additional components incorporated into the textile (e.g., zipper), processing and manufacture of the fabric (e.g. thread count, weave), and post-processing of the fabric (e.g. dying or printing). In one embodiment, the threshold temperature is preferably above 200 degrees Fahrenheit. Preferably the threshold temperature is above 215 degrees Fahrenheit. Preferably the threshold temperature is above 260 degrees Fahrenheit. Preferably the threshold temperature is above 320 degrees Fahrenheit.

In one embodiment the thermochromic indicator changes color upon application of a temperature of about 160 degrees Fahrenheit or higher. In one embodiment the thermochromic indicator changes color upon application of a temperature of about 165 degrees Fahrenheit or higher. In one embodiment the thermochromic indicator changes color upon application of a temperature of about 170 degrees Fahrenheit or higher. In one embodiment the thermochromic indicator changes color upon application of a temperature of about 175 degrees Fahrenheit or higher. In one embodiment the thermochromic indicator changes color upon application of a temperature of about 180 degrees Fahrenheit or higher. In one embodiment the thermochromic indicator changes color upon application of a temperature of about 185 degrees Fahrenheit or higher. In one embodiment the thermochromic indicator changes color upon application of a temperature of about 190 degrees Fahrenheit or higher. In one embodiment the thermochromic indicator changes color upon application of a temperature of about 195 degrees Fahrenheit or higher. In one embodiment the thermochromic indicator changes color upon application of a temperature of about 200 degrees Fahrenheit or higher. In one embodiment the thermochromic indicator changes color upon application of a temperature of about 205 degrees Fahrenheit or higher. In one embodiment the thermochromic indicator changes color upon application of a temperature of about 210 degrees Fahrenheit or higher. In one embodiment the thermochromic indicator changes color upon application of a temperature of about 215 degrees Fahrenheit or higher. In one embodiment the thermochromic indicator changes color upon application of a temperature of about 220 degrees Fahrenheit or higher. In one embodiment the thermochromic indicator changes color upon application of a temperature of about 225 degrees Fahrenheit or higher. In one embodiment the thermochromic indicator changes color upon application of a temperature of about 230 degrees Fahrenheit or higher. In one embodiment the thermochromic indicator changes color upon application of a temperature of about 235 degrees Fahrenheit or higher. In one embodiment the thermochromic indicator changes color upon application of a temperature of about 240 degrees Fahrenheit or higher. In one embodiment the thermochromic indicator changes color upon application of a temperature of about 245 degrees Fahrenheit or higher. In one embodiment the thermochromic indicator changes color upon application of a temperature of about 250 degrees Fahrenheit or higher. In one embodiment the thermochromic indicator changes color upon application of a temperature of about 255 degrees Fahrenheit or higher. In one embodiment the thermochromic indicator changes color upon application of a temperature of about 260 degrees Fahrenheit or higher. In one embodiment the thermochromic indicator changes color upon application of a temperature of about 265 degrees Fahrenheit or higher. In one embodiment the thermochromic indicator changes color upon application of a temperature of about 270 degrees Fahrenheit or higher. In one embodiment the thermochromic indicator changes color upon application of a temperature of about 275 degrees Fahrenheit or higher. In one embodiment the thermochromic indicator changes color upon application of a temperature of about 280 degrees Fahrenheit or higher. In one embodiment the thermochromic indicator changes color upon application of a temperature of about 285 degrees Fahrenheit or higher. In one embodiment the thermochromic indicator changes color upon application of a temperature of about 290 degrees Fahrenheit or higher. In one embodiment the thermochromic indicator changes color upon application of a temperature of about 295 degrees Fahrenheit or higher. In one embodiment the thermochromic indicator changes color upon application of a temperature of about 300 degrees Fahrenheit or higher. In one embodiment the thermochromic indicator changes color upon application of a temperature of about 305 degrees Fahrenheit or higher. In one embodiment the thermochromic indicator changes color upon application of a temperature of about 310 degrees Fahrenheit or higher. In one embodiment the thermochromic indicator changes color upon application of a temperature of about 315 degrees Fahrenheit or higher. In one embodiment the thermochromic indicator changes color upon application of a temperature of about 320 degrees Fahrenheit or higher. In one embodiment the thermochromic indicator changes color upon application of a temperature of about 325 degrees Fahrenheit or higher. In one embodiment the thermochromic indicator changes color upon application of a temperature of about 330 degrees Fahrenheit or higher. In one embodiment the thermochromic indicator changes color upon application of a temperature of about 335 degrees Fahrenheit or higher. In one embodiment the thermochromic indicator changes color upon application of a temperature of about 340 degrees Fahrenheit or higher. In one embodiment the thermochromic indicator changes color upon application of a temperature of about 345 degrees Fahrenheit or higher. In one embodiment the thermochromic indicator changes color upon application of a temperature of about 350 degrees Fahrenheit or higher. In one embodiment the thermochromic indicator changes color upon application of a temperature of about 355 degrees Fahrenheit or higher. In one embodiment the thermochromic indicator changes color upon application of a temperature of about 360 degrees Fahrenheit or higher. In one embodiment the thermochromic indicator changes color upon application of a temperature of about 355 degrees Fahrenheit or higher. In one embodiment the thermochromic indicator changes color upon application of a temperature of about 365 degrees Fahrenheit or higher. In one embodiment the thermochromic indicator changes color upon application of a temperature of about 370 degrees Fahrenheit or higher. In one embodiment the thermochromic indicator changes color upon application of a temperature of about 375 degrees Fahrenheit or higher. In one embodiment the thermochromic indicator changes color upon application of a temperature of about 380 degrees Fahrenheit or higher. In one embodiment the thermochromic indicator changes color upon application of a temperature of about 385 degrees Fahrenheit or higher. In one embodiment the thermochromic indicator changes color upon application of a temperature of about 390 degrees Fahrenheit or higher. In one embodiment the thermochromic indicator changes color upon application of a temperature of about 395 degrees Fahrenheit or higher. In one embodiment the thermochromic indicator changes color upon application of a temperature of about 400 degrees Fahrenheit or higher. In one embodiment the thermochromic indicator changes color upon application of a temperature of about 405 degrees Fahrenheit or higher. In one embodiment the thermochromic indicator changes color upon application of a temperature of about 410 degrees Fahrenheit or higher. In one embodiment the thermochromic indicator changes color upon application of a temperature of about 415 degrees Fahrenheit or higher. In one embodiment the thermochromic indicator changes color upon application of a temperature of about 420 degrees Fahrenheit or higher. In one embodiment the thermochromic indicator changes color upon application of a temperature of about 425 degrees Fahrenheit or higher. In one embodiment the thermochromic indicator changes color upon application of a temperature of about 430 degrees Fahrenheit or higher. In one embodiment the thermochromic indicator changes color upon application of a temperature of about 435 degrees Fahrenheit or higher. In one embodiment the thermochromic indicator changes color upon application of a temperature of about 440 degrees Fahrenheit or higher. In one embodiment the thermochromic indicator changes color upon application of a temperature of about 445 degrees Fahrenheit or higher. In one embodiment the thermochromic indicator changes color upon application of a temperature of about 451 degrees Fahrenheit or higher.

The thermochromic indicator of the invention may include one temperature threshold level or more than one temperature threshold level. The thermochromic indicator of the invention may include one temperature threshold level, two temperature threshold levels, three temperature threshold levels, four temperature threshold levels, five temperature threshold levels, six temperature threshold levels, seven temperature threshold levels, eight temperature threshold levels, nine temperature threshold levels, or ten temperature threshold levels. In one embodiment, the thermochromic indicator of the invention may include a first portion that changes color upon application of a temperature of a first temperature or higher, a second portion that changes color upon application of a second temperature higher than said first temperature or higher, and a third portion that changes color upon application of a third temperature higher than said second temperature higher. In one embodiment, the thermochromic indicator of the invention may include a first portion that changes color upon application of a temperature of about 220 degrees Fahrenheit or higher, a second portion that changes color upon application of a temperature of about 230 degrees Fahrenheit or higher, and a third portion that changes color upon application of a temperature of about 240 degrees Fahrenheit or higher.

The inventive linen may be used in an inventive method reporting a laundering or handling process that exceeds a threshold temperature. In one embodiment, the inventive linen is subjected to a heating step in excess of a threshold temperature. Upon exceeding the threshold temperature, a thermochromic indicator on the linen turns from a first color (or no color at all) to a second color (or turns a color for the first time). The thermochromic indicator thereafter does not further change color (or revert to the original color or disappear) upon falling below the threshold temperature.

EXAMPLES

Example 1

The following example is meant to be illustrative and prophetic only. In this example, a bed sheet is constructed from a single sheet of cotton. The sheet is comprised of temperature-sensitive thread that changes color upon application of a temperature of about 260 degrees Fahrenheit or higher.

Example 2

The following example is meant to be illustrative and prophetic only. In this example, a bed sheet is constructed of cotton. The sheet is completely constructed and then subjected to a dying step to incorporate a temperature-sensitive dye into the fabric of the sheet. The temperature-sensitive dye changes color upon application of a temperature of about 260 degrees Fahrenheit or higher.

Example 3

The following example is meant to be illustrative and prophetic only. In this example, a bed sheet is constructed of cotton. The sheet is completely constructed and a temperature-sensitive label is sewn into an edge of the sheet. The temperature-sensitive label includes a thermochromic indicator that has three discrete portions, each one of which changes color upon application of a different temperature. The thermochromic indicator has a first portion that changes color upon application of a temperature of about 240 degrees Fahrenheit or higher, a second portion that changes color upon application of a temperature of about 270 degrees Fahrenheit or higher, and a third portion that changes color upon application of a temperature of about 300 degrees Fahrenheit or higher.

Example 4

The following example is meant to be illustrative and prophetic only. In this example, a pillowcase includes a thermochromic indicator on a label affixed to the pillowcase. The pillowcase is subjected to a heating process raising the temperature of the pillowcase above a threshold temperature of 250 degrees Fahrenheit. Upon exceeding the threshold temperature of 250 degrees Fahrenheit the thermochromic indicator turns from a first color to a second color. The pillowcase is then allowed to cool to room temperature and the thermochromic indicator does not further change color (or revert to the original color or disappear) upon falling below the threshold temperature.

What is claimed is:

1. A method of identifying whether a laundered textile has been subjected to an excess threshold temperature during the drying of said laundered textile comprising: (a) laundering the textile comprising fabric and a nonreversible thermochromic indicator, wherein said indicator turns from a first color to a second color in response to reaching a temperature in excess of a threshold temperature, (b) allowing the textile to cool to an ambient room temperature, and (c) identifying whether the thermochromic indicator turned from a first color to the second color indicating that the laundered textile was subjected to a temperature in excess of the threshold temperature.

2. A method of claim 1, wherein the threshold temperature is between about 220 degrees Fahrenheit and about 320 degrees Fahrenheit.

3. A method of claim 1, wherein the threshold temperature is about 220 degrees Fahrenheit.

4. A method of claim 1, wherein the threshold temperature is about 300 degrees Fahrenheit.

5. A method of claim 1, wherein said fabric is formed as a sheet, towel, blanket, or pillowcase.

6. A method of claim 1, wherein the thermochromic indicator is incorporated into a label affixed to the fabric.

* * * * *